(12) United States Patent
Obata et al.

(10) Patent No.: US 8,999,880 B2
(45) Date of Patent: Apr. 7, 2015

(54) DEHYDROGENATION CATALYST AND METHOD FOR PRODUCING THE SAME

(71) Applicant: JX Nippon Oil & Energy Corporation, Tokyo (JP)

(72) Inventors: Nanako Obata, Tokyo (JP); Atsushi Segawa, Tokyo (JP); Yuichiro Hirano, Tokyo (JP)

(73) Assignee: JX Nippon Oil & Energy Corporation, Tokyo (JP)

( * ) Notice: Subject to any disclaimer, the term of this patent is extended or adjusted under 35 U.S.C. 154(b) by 0 days.

(21) Appl. No.: 14/286,450

(22) Filed: May 23, 2014

(65) Prior Publication Data

US 2014/0256541 A1   Sep. 11, 2014

Related U.S. Application Data

(62) Division of application No. 14/050,441, filed on Oct. 10, 2013.

(30) Foreign Application Priority Data

Oct. 30, 2012   (JP) .................................. 2012-239371

(51) Int. Cl.

| | | |
|---|---|---|
| *B01J 23/00* | (2006.01) | |
| *B01J 23/02* | (2006.01) | |
| *B01J 23/08* | (2006.01) | |
| *B01J 23/42* | (2006.01) | |
| *B01J 23/44* | (2006.01) | |
| *B01J 23/56* | (2006.01) | |
| *B01J 21/04* | (2006.01) | |
| *B01J 20/00* | (2006.01) | |
| *B01J 35/00* | (2006.01) | |
| *B01J 35/10* | (2006.01) | |
| *B01J 37/02* | (2006.01) | |

(52) U.S. Cl.
CPC ............. *B01J 23/42* (2013.01); *B01J 35/0053* (2013.01); *B01J 35/1019* (2013.01); *B01J 35/1061* (2013.01); *B01J 35/108* (2013.01); *B01J 37/0207* (2013.01); *Y02E 60/50* (2013.01)

(58) Field of Classification Search
CPC .................................. B01J 21/04; B01J 23/42
USPC .................. 502/332, 334, 339, 355, 415, 439
See application file for complete search history.

(56) References Cited

U.S. PATENT DOCUMENTS

| | | |
|---|---|---|
| 4,021,592 A | 5/1977 | Fromson |
| 5,347,828 A | 9/1994 | Kesten et al. |
| 5,693,207 A | 12/1997 | Fromson et al. |
| 5,833,931 A | 11/1998 | Fromson et al. |
| 6,214,765 B1 | 4/2001 | Fromson et al. |
| 6,479,430 B1 | 11/2002 | Fromson et al. |
| 7,625,840 B2 | 12/2009 | Pellin et al. |
| 7,713,907 B2 | 5/2010 | Elam et al. |
| 7,824,535 B2 | 11/2010 | Hatanaka et al. |
| 8,518,845 B2 | 8/2013 | Pellin et al. |
| 2007/0219092 A1 | 9/2007 | Hatanaka et al. |
| 2008/0124264 A1* | 5/2008 | Ikeda et al. ................. 423/213.5 |
| 2011/0311422 A1* | 12/2011 | Bentele et al. ............. 423/213.5 |
| 2012/0004098 A1* | 1/2012 | Xiao et al. ..................... 502/185 |
| 2012/0020843 A1* | 1/2012 | Bentele et al. ................ 422/169 |
| 2014/0121098 A1 | 5/2014 | Obata et al. |

FOREIGN PATENT DOCUMENTS

| | | |
|---|---|---|
| JP | 8-507361 | 8/1996 |
| JP | 2011-110437 | 6/2011 |

OTHER PUBLICATIONS

Office Action for U.S. Appl. No. 14/050,441, which was mailed on Jun. 6, 2014.

\* cited by examiner

*Primary Examiner* — Cam N. Nguyen
(74) *Attorney, Agent, or Firm* — Greenblum & Bernstein, P.L.C.

(57) ABSTRACT

A method for producing a dehydrogenation catalyst including an immersion step of impregnating an alumina layer of an alumina carrier with a platinum solution containing hexahydroxo platinate (IV) ions with an immersion method, wherein the alumina carrier has the alumina layer formed by anodic oxidation on at least a part of the surface of an aluminum support; and a calcination step of calcining the alumina carrier subjected to the immersion step to provide a dehydrogenation catalyst.

16 Claims, No Drawings

DEHYDROGENATION CATALYST AND METHOD FOR PRODUCING THE SAME

CROSS-REFERENCE TO RELATED APPLICATIONS

The present application is a divisional of U.S. application Ser. No. 14/050,441 filed on Oct. 10, 2013, which claims priority to Japanese Application No. 2012-239371, filed on Oct. 30, 2012. The disclosure of U.S. application Ser. No. 14/050,441 is incorporated by reference herein in its entirety.

TECHNICAL FIELD

The present invention relates to a dehydrogenation catalyst and a method for producing the same.

BACKGROUND

As a hydrogen source for fuel cells of automobiles and the like, use of cyclic hydrocarbons such as cyclohexane and methylcyclohexane has been considered recently. By allowing these cyclic hydrocarbons to act on a dehydrogenation catalyst, hydrogen and aromatic compounds are produced (see, for example, Patent Literatures 1 and 2).
Patent Literature 1: National Publication of International Patent Application No. 8-507361
Patent Literature 2: Japanese Patent Application Laid-Open No. 2011-110437

SUMMARY

The object of the present invention is to provide a dehydrogenation catalyst which can maintain high dehydrogenation ability for a long period and a method for producing such catalyst.

A first aspect of the present invention relates to a method for producing a dehydrogenation catalyst comprising an immersion step of impregnating an alumina layer of an alumina carrier with a platinum solution containing hexahydroxo platinate (IV) ions with an immersion method, wherein the alumina carrier has the alumina layer formed by anodic oxidation on at least a part of the surface of an aluminum support, and a calcination step of calcining the alumina carrier subjected to the immersion step to provide a dehydrogenation catalyst.

In this production method, since hexahydroxo platinate (IV) ions are excellent in adsorption to the alumina layer, a dehydrogenation catalyst with a large supported amount can be produced in a short time.

In one embodiment of the present invention, when the alumina layer is divided equally into three parts in the layer thickness direction and the parts are designated as a first region, a second region, and a third region in this order from the outside, it is preferable to support platinum on the alumina layer such that the mass ratio of platinum atoms to aluminum atoms in the first region $C_1$, the mass ratio of platinum atoms to aluminum atoms in the second region $C_2$, and the mass ratio of platinum atoms to aluminum atoms in the third region $C_3$ satisfy the relationship in the following formulas (1-1) and (1-2).

$$C_1 > C_2 \quad (1\text{-}1)$$

$$C_1 > C_3 \quad (1\text{-}2)$$

In the production method according to the present invention, adoption of an immersion method, in which a platinum solution containing hexahydroxo platinate (IV) ions is used, in the immersion step makes it possible to produce easily a dehydrogenation catalyst in which platinum is supported on an alumina layer so as to satisfy the formulas (1-1) and (1-2). Then, the dehydrogenation catalyst thus produced is excellent in the dehydrogenation ability and is able to maintain high catalyst activity for a long period. It should be noted that the immersion method is a supporting method in which an alumina carrier is immersed in a platinum solution to impregnate an alumina layer with the platinum solution.

In one embodiment of the present invention, the above described platinum solution may be those containing bis(ethanolammonium)hexahydroxo platinate(IV). In case a platinum source is bis(ethanolammonium)hexahydroxo platinate(IV), calcination can be sufficiently completed in a short time due to the low decomposition temperature of the hexahydroxo platinate(IV) complex, even when a low calcination temperature (for example, 320 to 380° C.) is selected in the calcination step. Therefore, according to the production method of this embodiment, aggregation of platinum is sufficiently suppressed, and it is possible to obtain a dehydrogenation catalyst that is more excellent in the catalyst activity.

In one embodiment of the present invention, it is preferable that the calcination temperature in the calcination step is 320 to 380° C. Thereby, it is possible to obtain a dehydrogenation catalyst having a suitable platinum surface area and able to maintain high dehydrogenation ability for a longer period.

In one embodiment of the present invention, it is preferable that, in the alumina carrier to be subjected to the immersion step, the specific surface area of the alumina layer is 200 m²/g or more, and the proportion of pores with a pore diameter of 1 to 10 nm in the total pores possessed by the alumina layer is 60% or more. By using such an alumina carrier, a dehydrogenation catalyst more excellent in the catalyst activity can be obtained.

A second aspect of the present invention relates to a dehydrogenation catalyst in which platinum is supported on an alumina carrier having an alumina layer formed by anodic oxidation on at least a part of the surface of an aluminum support, wherein when the alumina layer is divided equally into three parts in the layer thickness direction and the parts are designated as a first region, a second region, and a third region in order from the outside, the mass ratio of platinum atoms to aluminum atoms in the first region $C_1$, the mass ratio of platinum atoms to aluminum atoms in the second region $C_2$, and the mass ratio of platinum atoms to aluminum atoms in the third region $C_3$ satisfy the relationship in the following formulas (1-1) and (1-2).

$$C_1 > C_2 \quad (1\text{-}1)$$

$$C_1 > C_3 \quad (1\text{-}2)$$

Such dehydrogenation catalyst is not only excellent in the reaction efficiency of the dehydrogenation reaction to generate hydrogen and aromatic compounds from cyclic hydrocarbons, but also is able to maintain high catalyst activity for a long period.

In one embodiment of the present invention, it is preferable that the surface area of platinum per unit mass of platinum in the alumina layer is 140 m²/g or more. Such dehydrogenation catalyst is able to maintain dehydrogenation ability for a longer period.

In one embodiment of the present invention, it is preferable that the specific surface area of the alumina layer is 200 m²/g or more. Additionally, it is preferable that the proportion of pores with a pore diameter of 1 to 10 nm in the total pores possessed by the alumina layer is 60% or more. A dehydrogenation catalyst obtained by supporting platinum on an alumina carrier having such an alumina layer is more excellent in the catalyst activity.

A third aspect of the present invention relates to a dehydrogenation reaction apparatus comprising the above described dehydrogenation catalyst.

According to the present invention, a dehydrogenation catalyst capable of maintaining high dehydrogenation ability for a long period and a method for producing such catalyst are provided.

DETAILED DESCRIPTION

Preferred embodiments of the present invention will be described in the following.

[Dehydrogenation Catalyst]

A dehydrogenation catalyst according to this embodiment is a dehydrogenation catalyst wherein platinum is supported on an alumina carrier made by forming an alumina layer by anodic oxidation on at least a part of the surface of an aluminum support. In this embodiment, when the alumina layer is divided equally into three parts in the layer thickness direction and the parts are designated as a first region, a second region, and a third region in order from the outside, the mass ratio of platinum atoms to aluminum atoms in the first region $C_1$, the mass ratio of platinum atoms to aluminum atoms in the second region $C_2$, and the mass ratio of platinum atoms to aluminum atoms in the third region $C_3$ satisfy the relationship in the following formulas (1-1) and (1-2).

$$C_1 > C_2 \quad (1\text{-}1)$$

$$C_1 > C_3 \quad (1\text{-}2)$$

Conventionally, an approach to making a plate type catalyst wherein an active metal is supported on an alumina carrier having an alumina layer formed by anodic oxidation on the surface of an aluminum substrate as a support is known. However, it was difficult for a conventional plate type catalyst to maintain practically sufficient catalyst activity for a long period.

The present inventors have found that, in a plate type catalyst produced with the conventional production method, due to the production method, at least one of the mass ratio $C_2$ of platinum atoms to aluminum atoms at the center part in the thickness direction of the alumina layer (the second region) and the mass ratio $C_3$ of platinum atoms to aluminum atoms at the bottom part in the thickness direction of the alumina layer (the third region) becomes larger than the mass ratio $C_1$ of platinum atoms to aluminum atoms in the surface layer part of the alumina layer (the first region) (i.e. $C_2 > C_1$ and/or $C_3 > C_1$). Then, the present inventors have found that it becomes possible to maintain high catalyst activity for a long period by allowing the mass ratios $C_1$, $C_2$, and $C_3$ to satisfy the relationship in the formulas (1-1) and (1-2).

That is, in a dehydrogenation catalyst according to this embodiment, by supporting platinum on an alumina layer in accordance with the specific production method described in the following so as to satisfy the relationship in the formulas (1-1) and (1-2), the dehydrogenation ability can be enhanced as well as the high catalyst activity can be maintained for a long period, even if the total supported amount of platinum is not increased.

The mass ratio of platinum atoms to aluminum atoms in each region of the alumina layer can be determined by analysis of the cross section of the alumina layer with the energy dispersive X-ray spectroscopy (EDX).

It is more preferable that the mass ratios $C_1$, $C_2$, and $C_3$ satisfy the following formula (1-3). Thereby, the effects of the present invention are more significantly achieved. A dehydrogenation catalyst that satisfies such relationship can be obtained easily in accordance with a production method as described below.

$$C_1 > C_2 > C_3 \quad (1\text{-}3)$$

Additionally, it is more preferable that the mass ratios $C_1$, $C_2$, and $C_3$ satisfy the following formula (1-4).

$$C_1/(C_1+C_2+C_3) \geq 0.4 \quad (1\text{-}4)$$

In other words, it is preferable that, in the dehydrogenation catalyst, the mass ratio $C_1$ is larger enough than $C_2$ and $C_3$ to satisfy the formula (1-4). The dehydrogenation catalyst that satisfies the relationship in the formula (1-4) achieves the effects of the present invention more significantly.

Furthermore, since, in the alumina layer formed by anodic oxidation, there is not necessarily a large difference between the amounts of aluminum in the first region, the second region, and the third region, $C_1/(C_1+C_2+C_3)$ becomes a value close to the ratio of the amount of platinum supported in the first region to the total amount of platinum supported.

$C_1/(C_1+C_2+C_3)$ may be 0.8 or less, and may be 0.7 or less. If $C_1/(C_1+C_2+C_3)$ exceeds 0.8, aggregation of platinum in the first region becomes easy to occur because of the large supported amount of platinum in the first region, and therefore sufficient catalyst activity commensurate with the total supported amount may become difficult to obtain. Furthermore, there is an aspect that it is difficult for the production method as described below to support platinum such that $C_1/(C_1+C_2+C_3)$ exceeds 0.8.

In the dehydrogenation catalyst according to this embodiment, it is preferable that a surface area of platinum per unit mass of platinum in the alumina layer is 140 m$^2$/g or more. Such dehydrogenation catalyst can be produced by setting the calcination temperature in the calcination step of the production method as described below to 320 to 380° C. Then, such dehydrogenation catalyst can maintain the high dehydrogenation ability for a longer period. Additionally, a surface area of platinum per unit mass of platinum may be 250 m$^2$/g or less, and may be 200 m$^2$/g or less.

The surface area of platinum per unit mass of platinum is an index that shows the dispersity of platinum in the dehydrogenation catalyst, and can be measured in accordance with a method wherein platinum is reduced at 300° C. and then, allow to adsorb CO (carbon monoxide) at 50° C. and the amount of CO absorbed to the platinum is measured, as detailed in Examples.

The total supported amount of platinum in the dehydrogenation catalyst can be changed as appropriate depending on the applications. For example, it is possible to set the total supported amount of platinum to 130 to 500 μg/cm$^2$.

The alumina carrier can be obtained, for example, by forming an alumina layer by anodic oxidation on at least a part of the surface of an aluminum support. The aluminum support herein is not necessarily a plate type (an aluminum plate substrate and the like), and can be changed in its shape as appropriate depending on types of hydrogen generation apparatuses to be utilized.

It is preferable that the specific surface area of the alumina layer is 200 m$^2$/g or more, and it is more preferable that it is 210 m$^2$/g or more. By use of an alumina carrier with a large specific surface area, the surface area of platinum per unit mass of platinum tends to become larger in the dehydrogenation catalyst. Additionally, in this embodiment, platinum is supported on the alumina layer so as to satisfy the formulas (1-1) and (1-2), preferably so as to further satisfy the formula (1-3) or (1-4), and more preferably so as to satisfy the formulas (1-3) and (1-4) as mentioned above, and with an alumina layer having such specific surface area, platinum can be supported so as to sufficiently satisfy each formula, even in the case that the total supported amount of platinum is increased (for example, 230 μg/cm² or more). The specific surface area of the alumina layer may be 300 m²/g or less, and may be 280 m²/g or less.

It is preferable that the alumina layer is porous and that the proportion of pores with a pore diameter of 1 to 10 nm in the total pores is 60% or more. With such alumina layer, since aggregation resulted from calcination of platinum supported and the like becomes difficult to occur, a dehydrogenation catalyst with a large surface area of platinum can be easily obtained. It is preferable that this proportion is 65% or more, may be 90% or less, and may be 85% or less.

The thickness of the alumina layer is preferably 5 to 50 μm, more preferably 10 to 45 μm, and yet more preferably 15 to 40 μm.

It is preferable that the alumina layer is an amorphous alumina layer. It should be noted that amorphous herein means that peaks indicating crystallinity cannot be observed in the result of X-ray diffraction analysis.

Anodic oxidation to form alumina layers can be performed with known methods. Although the conditions of anodic oxidation are not particularly limited, anodic oxidation using, for example, an oxalate solution as a treatment bath is suitable.

Additionally, the alumina carrier may be those obtained via post-treatments, such as hot water treatment and calcination, after anodic oxidation.

Specifically, for example, anodic oxidation of an aluminum substrate is performed using 0.1 to 0.3 M oxalic acid solution as a treatment bath under conditions of 40 to 60° C. and 30 to 50 V for 1 to 2 hours, and then, the resultant substrate is subjected to hot-water treatment by immersion in boiling pure water for 5 to 6 hours and finally calcined to thereby obtain an alumina carrier.

[Method for Producing a Dehydrogenation Catalyst]

A method for producing a dehydrogenation catalyst according to this embodiment includes an immersion step of impregnating an alumina layer of an alumina carrier having the alumina layer formed by anodic oxidation on at least a part of the surface of an aluminum support with a platinum solution containing hexahydroxo platinate (IV) ions with an immersion method, and a calcination step of calcining the alumina carrier subjected to the immersion step to provide a dehydrogenation catalyst.

In the production method according to this embodiment, since hexahydroxo platinate (IV) ions are excellent in adsorption to alumina layers, a dehydrogenation catalyst with a large supported amount can be produced in a short time.

Additionally, the production method according to this embodiment can be performed such that the mass ratio $C_1$, $C_2$, and $C_3$ of platinum atoms to aluminum atoms in the first region, the second region, and the third region of the alumina layer satisfy the relationship in the above described formulas (1-1) and (1-2) (preferably such that the ratios further satisfy the relationship in the formula (1-3) or (1-4), and more preferably such that the ratios further satisfy the relationship in the formulas (1-3) and (1-4)). Then, in accordance with such production method, the dehydrogenation catalyst according to the above described embodiment can be obtained easily and efficiently. Hereinafter, each step to obtain the dehydrogenation catalyst according to the above described embodiment will be described in detail.

(Immersion Step)

In the immersion step, the alumina layer of the alumina carrier is impregnated with a platinum solution containing hexahydroxo platinate (IV) ions with an immersion method.

Methods to support an active metal on a conventional plate type catalyst include a dropping method wherein a specified amount of a solution containing an active metal is dropped on the support layer of a plate type carrier. In such dropping method, there is an advantage that the mass of the active metal to be supported can be adjusted easily by controlling with the amount of the solution to be dropped.

However, according to the findings of the present inventors, if such dropping method is performed at the time of supporting platinum on the alumina layer according to this embodiment, a large amount of platinum is supported at the center part (the second region) and the bottom part (the third region) of the alumina layer, a sufficient supported amount of platinum cannot be obtained at the surface layer part of the alumina layer (the first region), and at least one of the mass ratios $C_2$ and $C_3$ becomes larger than the mass ratio $C_1$.

Additionally, as a platinum solution conventionally used at the time of supporting platinum on a catalyst carrier, use of a platinum solution containing a platinum source such as hexachloroplatinate (IV) and tetraammineplatinum (II) salts is common from the viewpoint ease of availability and ease of handling.

However, according to the findings of the present inventors, if such platinum solution is used at the time of supporting platinum on the alumina layer according to this embodiment, a sufficient supported mass on the alumina layer is difficult to achieve with the immersion method. Therefore, repetition(s) of the immersion method may become necessary to secure a sufficient supported mass. Then, in the dehydrogenation catalyst resulted from repetition(s) of the immersion method, a large amount of platinum is supported at the center part (the second region) and the bottom part (the third region) of the alumina layer, platinum is not sufficiently supported at the surface layer part of the alumina layer (the first region), and at least one of the mass ratios $C_2$ and $C_3$ becomes larger than the mass ratio $C_1$.

In the production method according to this embodiment, by an immersion step of impregnating an alumina layer of the alumina carrier with a platinum solution containing hexahydroxo platinate (IV) ions with an immersion method, it is possible to support platinum so as to satisfy the relationship in the formulas (1-1) and (1-2).

In the immersion step, from a viewpoint to increase the amount of platinum supported on the surface layer part of the alumina layer (the first region), it is preferable that the number of performance of the immersion method is one. It should be noted that the immersion method is performed by immersing an alumina carrier in a platinum solution and drawing up the carrier after a predetermined time.

In the immersion step, it is possible to adjust the amount of platinum supported on the alumina layer by changing the platinum concentration in the platinum solution. It is preferable that the platinum concentration in the platinum solution is, for example, 1 to 100 g/L.

In the immersion step, although the time for immersing the alumina carrier in the platinum solution can be changed as appropriate depending on the supported amount of platinum required, it is possible to set the time to, for example, 1 to 60 seconds. If the immersion time is reduced to less than 1 second, control of the supported amount of platinum tends to be difficult at the time of industrially producing dehydrogenation catalysts. In contrast, if the immersion time is extended to more than 60 seconds, it becomes economically disadvantageous.

The platinum solution can be a solution containing a hexahydroxo platinate (IV). Examples of hexahydroxo platinates (IV) include bis(ethanolammonium)hexahydroxo platinate (IV), sodium hexahydroxo platinate (IV), and potassium hexahydroxo platinate (IV), and among these, bis(ethanolammonium)hexahydroxo platinate (IV) is preferred. Bis(ethanolammonium)hexahydroxo platinate (IV) is a compound represented by $(H_3NCH_2CH_2OH)_2[Pt(OH)_6]$.

With bis(ethanolammonium)hexahydroxo platinate (IV), since the decomposition temperature of the hexahydroxo platinate (IV) complex is low, calcination can be sufficiently completed in a short time even when a calcination temperature lower than the conventional calcination temperature (for example, 320 to 380° C.) is selected in the calcination step described below.

In the immersion method, an alumina carrier is immersed in a platinum solution. Since the alumina carrier has an unoxidized aluminum substrate part, it is desirable that the platinum solution is at a pH that does not erode the aluminum substrate part. That is, it is preferable that the pH of the platinum solution is 6 to 12, and it is more preferable that the pH is 7 to 11. Additionally, if the pH of platinum solution is 8 to 10.5, the effect that platinum becomes easy to be supported on the alumina layer is achieved.

It is preferable for the platinum solution to achieve the above described pH by hexahydroxo platinate (IV). For example, since bis(ethanolammonium)hexahydroxo platinate (IV) solution is at pH 9 to 10.5, it is possible to use it particularly suitably as a platinum solution.

(Calcination Step)

In the calcination step, the alumina carrier subjected to the above described immersion step is calcined to obtain a dehydrogenation catalyst. The alumina carrier is usually subjected to the calcination step after the solvent of the platinum solution impregnated in the alumina layer is dried off.

The calcination temperature is preferably 250 to 400° C., and more preferably 320 to 380° C.

In the production method of this embodiment, a large amount of platinum is supported on the surface layer part of the alumina layer (the first region) by the immersion step. Thus, aggregation of platinum is easy to occur at the surface layer part by calcination. It is possible to sufficiently suppress the aggregation of platinum at the surface layer part by setting the calcination temperature to the above described suitable range. Particularly, by setting the calcination temperature to 320 to 380° C., it is possible to easily obtain a dehydrogenation catalyst with a platinum surface area of platinum of 140 $m^2/g$ or more.

The calcination time is preferably 10 to 120 minutes, and more preferably 20 to 60 minutes.

[Dehydrogenation Reaction Apparatus]

A dehydrogenation reaction apparatus according to this embodiment includes a dehydrogenation catalyst according to the above described embodiment.

The dehydrogenation reaction apparatus may be an apparatus that has a known configuration except that the dehydrogenation catalyst is a dehydrogenation catalyst according to the above described embodiment.

For example, the dehydrogenation reaction apparatus may be an apparatus that comprises a raw material compound flow path to pass raw material compounds on one side of the dehydrogenation catalyst and a high temperature gas flow path to pass a high temperature gas on the other side of the dehydrogenation catalyst. Additionally, the dehydrogenation reaction apparatus may have a multilayer configuration in which a raw material compound flow path or a high temperature gas flow path and a dehydrogenation catalyst are alternately arranged.

Examples of raw material compounds to be supplied to the dehydrogenation reaction apparatus include cyclic hydrocarbons such as cyclohexane, methyl cyclohexane, dimethylcyclohexane, decalin, 1-methyldecalin, 2-methyldecalin, and 2-ethyldecalin.

The conditions of dehydrogenation reaction in the dehydrogenation reaction apparatus can be changed as appropriate depending on types of raw material compounds, the configuration of the dehydrogenation reaction apparatus and the like. For example, in the case that the raw material compound is methylcyclohexane, the reaction temperature can be set at 250 to 400° C.

Since the dehydrogenation reaction apparatus according to this embodiment is an apparatus that comprises the above described dehydrogenation catalyst, it is possible to perform dehydrogenation reaction of raw material compounds at high dehydrogenation ability over a long period. Thus, the dehydrogenation reaction apparatus according to this embodiment is suitable for application in hydrogen stations and the like to supply hydrogen to fuel cell automobiles.

The suitable embodiments of the present invention have been described above, but the present invention is not limited to the above described embodiments.

EXAMPLES

Hereinbelow, the invention is described more specifically according to Examples, but the present invention is not intended to be limited to Examples.

Preparation Example 1

Production of an Alumina Carrier

Anodic oxidation was performed to an aluminum plate (0.05 cm in thickness, 6 cm×6 cm) in 0.1 to 0.3 M oxalate solution under conditions of 40 to 60° C. and 30 to 50 V for 1 to 2 hours. Then, the plate was subjected to hot-water treatment by immersion in boiling pure water for 5 to 6 hours and finally calcined under conditions of 500° C. for 3 hours to thereby obtain an alumina carrier with alumina layers of 15 to 30 μm in thickness formed on each side of the aluminum plate.

When X-ray diffraction analysis with RINT2500 (manufactured by Rigaku Corporation) was performed on the alumina layers on the alumina carrier, peaks indicating crystallinity were not observed.

Additionally, pore size distribution on the alumina layers of the alumina carrier was measured according to the nitrogen adsorption method. As the result of the measurement, the average pore size of the alumina layer was 10 nm, and the proportion of pores with a pore diameter of 1 to 10 nm in the total pores was 73%.

The measurement conditions were as the following.
Device: BELSORP-MAC-2 (manufactured by BEL Japan, Inc.)
Pressure sensor: 133 kPa (accuracy±0.5% FS), 1.33 kPa (accuracy±0.5% R), 0.0133 kPa (accuracy±0.12% R)
Pressure resolution: $1.6 \times 10^{-6}$ Pa
Air thermostatic chamber temperature: −40° C.
Exhaust system: anticorrosive diaphragm pump+turbo molecular pump
Ultimate vacuum: $6.7 \times 10^{-7}$ Pa Specific surface area: 0.01 m²/g or more (in use of N₂)
Pore size distribution: 0.35 to 200 nm
Measuring part electric furnace: RT to 450° C.

Additionally, when the specific surface area of the alumina layers of the alumina carrier was measured in accordance to a method measuring the amount of nitrogen gas adsorbed, the specific surface area was 233 m²/g.

Example 1

The alumina carrier obtained in Preparation Example 1 was immersed in bis(ethanolammonium)hexahydroxo platinate (IV) aqueous solution (platinum concentration: 25 g/L) for 10 seconds, and then dried under conditions of 120° C. for 1.0 minutes. Then, the carrier was calcined under conditions of 270° C. for 20 minutes to obtain a dehydrogenation catalyst A-1.

Comparative Example 1

An alumina carrier obtained in same way as in Preparation Example 1 was immersed in tetraammineplatinum nitrate solution (platinum concentration: 53 g/L) for 2 hours, and then dried under conditions of 120° C. for 10 minutes. After calcination, the carrier was immersed again in tetraammineplatinum nitrate solution (platinum concentration: 53 g/L) for 2 hours and calcined under conditions of 300° C. for 20 minutes to obtain a dehydrogenation catalyst B-1.

The dehydrogenation catalysts obtained in Example 1 and Comparative Example 1 were evaluated in the following method.

(Measurement of Amount of Platinum Supported)

One cm² of the dehydrogenation catalyst was immersed in 1 N nitric acid under conditions of 140° C. for 30 minutes to dissolve the alumina layer, and the remained aluminum plate was taken out. To the solution in which the alumina layer was dissolved, hydrochloric acid in an amount of three-times of nitric acid was added, and heated at 140° C. for 1 hour. Then, sulfuric acid (concentrated sulfuric acid: water=1:1) was added thereto, and heated at 300° C. for 1 hour. This solution was dried to solidify, and 1 N nitric acid was added to the dried solid, and heated at 140° C. for 20 minutes. The resultant solution was diluted with water to the total amount of 50 ml to obtain a sample for measurement.

The obtained sample for measurement was measured with an ICP-AES (inductively coupled plasma mass spectrometer) to measure the platinum mass. The measurement conditions were as the following.
Device: PS3000 (manufactured by Seiko Instruments Inc.)
Radio frequency output: 1.3 kW
Plasma gas amount: 1.6 L/minute
Observation height: 12 mm
Quantifying method: Y internal standard measurement method
Measurement wavelength
Pt: 214.423 nm
Y: 371.030 nm As the result of the evaluation, both of the dehydrogenation catalyst A-1 and the dehydrogenation catalyst B-1 had a supported amount of platinum of 150 μg/cm².

(Platinum Distribution Analysis of the Alumina Layer Cross Section)

On a cross section of the dehydrogenation catalysts, EDX quantitative analysis (accelerating voltage: 15 kV, non deposition, magnification: 2000) was performed using an SEM-EDS device (JSM-6300F, manufactured by JEOL Ltd.). The thickness of an alumina layer was divided equally into three parts, the parts was designated as a first region, a second region, and a third region in order from the outside, and the mass ratio of platinum atoms to aluminum atoms in each region ($C_1$, $C_2$, and $C_3$) was evaluated. The evaluation results are shown in Table 1.

TABLE 1

|  | Example 1 | Comparative Example 1 |
|---|---|---|
| Mass ratio $C_1$ in the first region | 0.19 | 0.23 |
| Mass ratio $C_2$ in the second region | 0.12 | 0.38 |
| Mass ratio $C_3$ in the third region | 0.04 | 0.17 |

(Measurement of Catalyst Activity)

Dehydrogenation reaction of methylcyclohexane was performed by passing methylcyclohexane (hereinafter, sometimes referred to as "MCH") over both sides of a 4 cm×2 cm piece of dehydrogenation catalyst. The reaction conditions were set to the reaction temperature of 330° C. and the methylcyclohexane flow rate of 0.4 ml/min.

The passed gas was cooled to be collected as liquid every hour, and GC analysis was performed. Conversion ratios of methylcyclohexane were determined from the content of methylcyclohexane and toluene in the liquid (the toluene amount (% by mol) was regarded as the methylcyclohexane conversion ratio.).

The evaluation result of each hour is shown in Table 2.

TABLE 2

| | MCH conversion ratio (%) | |
|---|---|---|
| Evaluation time (h) | Example 1 | Comparative Example 1 |
| 1 | 40 | 34 |
| 2 | 39 | 33 |
| 3 | 37 | 32 |
| 4 | 35 | 30 |
| 5 | 34 | 29 |
| 6 | 33 | 29 |
| 7 | 32 | 28 |

Examples 2 to 7

Dehydrogenation catalysts were made in the same manner as in Example 1 except that the calcination temperature was changed to 250° C. (Example 2), 300° C. (Example 3), 330° C. (Example 4), 350° C. (Example 5), 370° C. (Example 6), or 400° C. (Example 7).

For obtained dehydrogenation catalysts, the platinum surface area of platinum (metal dispersity) was measured according to the following method. Additionally, for dehydrogenation catalysts obtained in Examples 5 and 7, catalyst activity was measured according to the following method.

(Measurement of Platinum Surface Area)

In a measuring cell, 5 mm squares of dehydrogenation catalyst were packed to 4 cm³. Then, the sample was mounted on a measurement device (BEL-METAL), which was purged with He gas. Under passing He, the temperature was increased to 300° C. over 20 minutes, and after reached 300° C., the temperature was maintained for 15 minutes. Then, the gas was switched to $H_2$, and passed for 20 minutes to perform reduction reaction. Then, the gas was switched to He, and passed for 15 minutes to perform purging. Under passing He, the temperature was decreased to 50° C., and maintained at 50° C. for 15 minutes. Then, CO adsorption was performed, and from the result of the CO adsorption, the platinum surface area of platinum was evaluated.

The evaluation results are shown in Table 3.

TABLE 3

|  | Calcination temperature (° C.) | Platinum surface area of platinum (cm²/g) |
|---|---|---|
| Example 2 | 250 | 100 |
| Example 1 | 270 | 121 |
| Example 3 | 300 | 127 |
| Example 4 | 330 | 159 |
| Example 5 | 350 | 146 |
| Example 6 | 370 | 142 |
| Example 7 | 400 | 131 |

(Measurement of Catalyst Activity)

Dehydrogenation reaction of methylcyclohexane was performed by passing methylcyclohexane (hereinafter, sometimes referred to as "MCH") over both sides of a 4 cm×4 cm piece of dehydrogenation catalyst. The reaction conditions were set to the reaction temperature of 330° C. and the methylcyclohexane flow rate of 0.2 ml/min. The passed gas was cooled to be collected as liquid after 1 hour from the start of the reaction, and GC analysis was performed. Conversion ratios of methylcyclohexane were determined from the content of methylcyclohexane and toluene in the liquid (the toluene amount (% by mol) was regarded as the methylcyclohexane conversion ratio).

This measurement was performed three times, and the conversion ratio of each time was obtained. Additionally, after the third measurement, heat treatment was performed in air under conditions at 300° C. for 1 hour to remove cokes on the catalyst. Then, the above described measurement was further performed three times, and the conversion ratio of each time was obtained. The results are shown in Table 4.

TABLE 4

| | MCH conversion ratio (%) | |
|---|---|---|
| Evaluation number (times) | Example 5 (Calcined at 350° C.) | Example 7 (Calcined at 400° C.) |
| 1 | 95 | 89 |
| 2 | 91 | 85 |
| 3 | 89 | 82 |
| 4 | 94 | 87 |
| 5 | 91 | 82 |
| 6 | 89 | 79 |

What is claimed is:

1. A method for producing a dehydrogenation catalyst comprising:
   an immersion step of impregnating an alumina layer of an alumina carrier with a platinum solution containing hexahydroxo platinate (IV) ions by an immersion method, wherein the alumina carrier has the alumina layer formed by anodic oxidation on at least a part of the surface of an aluminum support; and
   a calcination step of calcining the platinum impregnated alumina carrier prepared in the immersion step to provide a dehydrogenation catalyst.

2. The production method according to claim 1, wherein, in the dehydrogenation catalyst, when the alumina layer is divided equally into three parts in the layer thickness direction and the parts are designated as a first region, a second region, and a third region in order from the outside, the mass ratio of platinum atoms to aluminum atoms in the first region $C_1$, the mass ratio of platinum atoms to aluminum atoms in the second region $C_2$, and the mass ratio of platinum atoms to aluminum atoms in the third region $C_3$ satisfy the relationship in the following formulas (1-1) and (1-2):

$$C_1 > C_2 \quad (1\text{-}1)$$

$$C_1 > C_3 \quad (1\text{-}2).$$

3. The production method according to claim 2, wherein the platinum solution contains bis(ethanolammonium) hexahydroxo platinate (IV).

4. The production method according to claim 3, wherein the calcination temperature in the calcination step is 320 to 380° C.

5. The production method according to claim 4, wherein the specific surface area of the alumina layer is 200 m²/g or more, and the proportion of pores with a pore diameter of 1 to 10 nm in the total pores possessed by the alumina layer is 60% or more.

6. The production method according to claim 3, wherein the specific surface area of the alumina layer is 200 m²/g or more, and the proportion of pores with a pore diameter of 1 to 10 nm in the total pores possessed by the alumina layer is 60% or more.

7. The production method according to claim 2, wherein the calcination temperature in the calcination step is 320 to 380° C.

8. The production method according to claim 7, wherein the specific surface area of the alumina layer is 200 m²/g or more, and the proportion of pores with a pore diameter of 1 to 10 nm in the total pores possessed by the alumina layer is 60% or more.

9. The production method according to claim 2, wherein the specific surface area of the alumina layer is 200 m²/g or more, and the proportion of pores with a pore diameter of 1 to 10 nm in the total pores possessed by the alumina layer is 60% or more.

10. The production method according to claim 1, wherein the platinum solution contains bis(ethanolammonium) hexahydroxo platinate (IV).

11. The production method according to claim 10, wherein the calcination temperature in the calcination step is 320 to 380° C.

12. The production method according to claim 11, wherein the specific surface area of the alumina layer is 200 m²/g or more, and the proportion of pores with a pore diameter of 1 to 10 nm in the total pores possessed by the alumina layer is 60% or more.

13. The production method according to claim 10, wherein the specific surface area of the alumina layer is 200 m²/g or more, and the proportion of pores with a pore diameter of 1 to 10 nm in the total pores possessed by the alumina layer is 60% or more.

14. The production method according to claim 1, wherein the calcination temperature in the calcination step is 320 to 380° C.

15. The production method according to claim 14, wherein the specific surface area of the alumina layer is 200 m²/g or more, and the proportion of pores with a pore diameter of 1 to 10 nm in the total pores possessed by the alumina layer is 60% or more.

16. The production method according to claim 1, wherein the specific surface area of the alumina layer is 200 m²/g or more, and the proportion of pores with a pore diameter of 1 to 10 nm in the total pores possessed by the alumina layer is 60% or more.

* * * * *